US012500279B2

(12) United States Patent
Ekler et al.

(10) Patent No.: US 12,500,279 B2
(45) Date of Patent: Dec. 16, 2025

(54) COMMUNICATION FOR BATTERY CELL CIRCUIT USING A COMPARISON RESULT VALUE

(71) Applicant: Infineon Technologies AG, Neubiberg (DE)

(72) Inventors: Markus Ekler, Feldkirchen (DE); Christian Walther, Munich (DE); Christian Heiling, Graz (AT)

(73) Assignee: Infineon Technologies AG, Neubiberg (DE)

( * ) Notice: Subject to any disclaimer, the term of this patent is extended or adjusted under 35 U.S.C. 154(b) by 660 days.

(21) Appl. No.: 17/811,203

(22) Filed: Jul. 7, 2022

(65) Prior Publication Data
US 2024/0014452 A1   Jan. 11, 2024

(51) Int. Cl.
*H01M 10/42* (2006.01)
*G01R 31/396* (2019.01)
*H01M 10/48* (2006.01)

(52) U.S. Cl.
CPC ........ *H01M 10/425* (2013.01); *G01R 31/396* (2019.01); *H01M 10/48* (2013.01); *H01M 2010/4271* (2013.01)

(58) Field of Classification Search
CPC ........... H01M 10/425; H01M 10/4257; H01M 10/48; H01M 10/482; H01M 2010/4271; H01M 2010/4278; G01R 31/396
See application file for complete search history.

(56) References Cited

U.S. PATENT DOCUMENTS

2018/0026800 A1   1/2018   Munoz et al.
2019/0196998 A1*  6/2019   Koike ............... G06F 13/40
2022/0126726 A1   4/2022   Kim

FOREIGN PATENT DOCUMENTS

KR        20190012718      *  2/2019

OTHER PUBLICATIONS

KR20190012718 English translation. Park et al. Korea. Feb. 11, 2019. (Year: 2019).*
U.S. Appl. No. 17/811,214, filed Jul. 7, 2022, naming inventors Ekler et al.

* cited by examiner

*Primary Examiner* — Christopher P Domone
(74) *Attorney, Agent, or Firm* — Shumaker & Sieffert, P.A.

(57) ABSTRACT

A battery cell circuit of a battery management system configured to receive, from a previous battery cell circuit of a plurality of battery cell circuits connected in a daisy chain configuration or ring configuration, an instruction requesting a value for the battery cell circuit and determine a comparison result value based on a comparison of the value for the battery cell circuit and a reference value. The battery cell circuit is further configured to output, to a controller, the comparison result value, wherein, to output the comparison result value, the battery cell circuit is configured to refrain from outputting the value for the battery cell circuit.

17 Claims, 15 Drawing Sheets

COMMUNICATION FOR BATTERY CELL CIRCUIT USING A COMPARISON RESULT VALUE

TECHNICAL FIELD

This disclosure relates to device communication.

BACKGROUND

A system may be arranged to permit communication between a controller and a device. For example, a controller may output a request for data to a device. The device outputs, to the controller, the data requested by the first device. In this manner, the device may communicate with the controller to help exchange data.

In some situations, a number of devices may be controlled in a larger system. Devices may be arranged in various configurations, such as daisy chain configurations, whereby devices communicate information to other devices. In some situations, a system-level controller, such as a microcontroller, may send control signals to one or more devices to control the devices at a system level.

SUMMARY

The disclosure describes techniques, devices, and systems for communication. For example, a device may determine whether to respond to an instruction requesting data based on a comparison result value that is determined based on a comparison of data for the device and a reference value. For instance, the data may indicate a hash value generated by applying a hash function on a register value of the device. In this instance, the device may refrain from responding to the instruction in response to determining that the generated hash value matches an expected hash value indicated by the reference value. In this way, the device may reduce an amount of data communicated.

In some examples, a device may determine a comparison result value based on a comparison of a value for the battery cell circuit and a reference value. The reference value may indicate, for example, an expected value of a voltage value, a current value, a resistance value, or a temperature value for a battery cell managed by the battery cell circuit. In this example, the device may output, to a controller, the comparison result value and refrain from outputting the value for the battery cell circuit. For example, the device may output a difference between an expected temperature value indicated by the reference value and an instant temperature value (e.g., a measured temperature value or a determined temperature value) indicated by the value for the battery cell circuit. In this way, the device may reduce an amount of data communicated.

In one example, a device is configured to receive, from a controller, an instruction requesting data for the device and determine a comparison result value based on a comparison of the data for the device and a reference value. The device is further configured to determine whether to respond to the instruction based on the comparison result value and, in response to a determination to respond to the instruction, output, to the controller, the comparison result value. To output the comparison result value, the device is configured to refrain from outputting the data for the device.

In some examples, a method includes receiving, by a device, from a controller, an instruction requesting data for the device and determining, by the device, a comparison result value based on a comparison of the data for the device and a reference value. The method further includes determining, by the device, whether to respond to the instruction based on the comparison result value and, in response to determining to respond to the instruction, outputting, by the device, to the controller, the comparison result value. Outputting the comparison result value comprises refraining from outputting the data for the device.

In one example, a system includes a controller configured to output an instruction requesting data for the device. The device is configured to receive, from the controller, the instruction requesting data for the device and determine a comparison result value based on a comparison of the data for the device and a reference value. The device is further configured to determine whether to respond to the instruction based on the comparison result value and, in response to a determination to respond to the instruction, output, to the controller, the comparison result value. To output the comparison result value, the device is configured to refrain from outputting the data for the device.

In some examples, a battery cell circuit of a battery management system is configured to receive, from a previous battery cell circuit of a plurality of battery cell circuits connected in a daisy chain configuration or ring configuration, an instruction requesting a value for the battery cell circuit and determine a comparison result value based on a comparison of the value for the battery cell circuit and a reference value. The battery cell circuit is further configured to output, to a controller, the comparison result value. To output the comparison result value, the battery cell circuit is configured to refrain from outputting the value for the battery cell circuit.

In one example, a method includes receiving, from a previous battery cell circuit of a plurality of battery cell circuits connected in a daisy chain configuration or ring configuration, an instruction requesting a value for the battery cell circuit and determining a comparison result value based on a comparison of the value for the battery cell circuit and a reference value. The method further includes outputting, to a controller, the comparison result value. Outputting the comparison result value comprises refraining from outputting the value for the battery cell circuit.

In some examples, a controller is configured to output, to a plurality of battery cell circuits connected in a daisy chain configuration or ring configuration, an instruction requesting a value for a battery cell circuit of the plurality of battery cell circuits and receive a comparison result value from the plurality of battery cell circuits connected in the daisy chain configuration or ring configuration. The controller is further configured to determine a value for the battery cell circuit based on the comparison result value and a reference value.

In one example, a method includes outputting an instruction requesting a value for a battery cell circuit of a plurality of battery cell circuits connected in a daisy chain configuration or ring configuration. The method further includes receiving a comparison result value from the plurality of battery cell circuits connected in the daisy chain configuration or ring configuration and determining a value for the battery cell circuit based on the comparison result value and a reference value.

In another example, a system includes a plurality of battery cell circuits connected in a daisy chain configuration or ring configuration. A battery cell circuit of the plurality of battery cell circuits is configured to receive, from a previous battery cell circuit of a plurality of battery cell circuits connected in a daisy chain configuration or ring configuration, an instruction requesting a value for the battery cell circuit and determine a comparison result value based on a comparison of the value for the battery cell circuit and a reference value. The battery cell circuit is further configured to output, to a controller, the comparison result value. To output the comparison result value, the battery cell circuit is configured to refrain from outputting the value for the battery cell circuit.

The details of one or more examples are set forth in the accompanying drawings and the description below. Other features, objects, and advantages of the disclosure will be apparent from the description and drawings, and from the claims.

DETAILED DESCRIPTION

Figure 1:
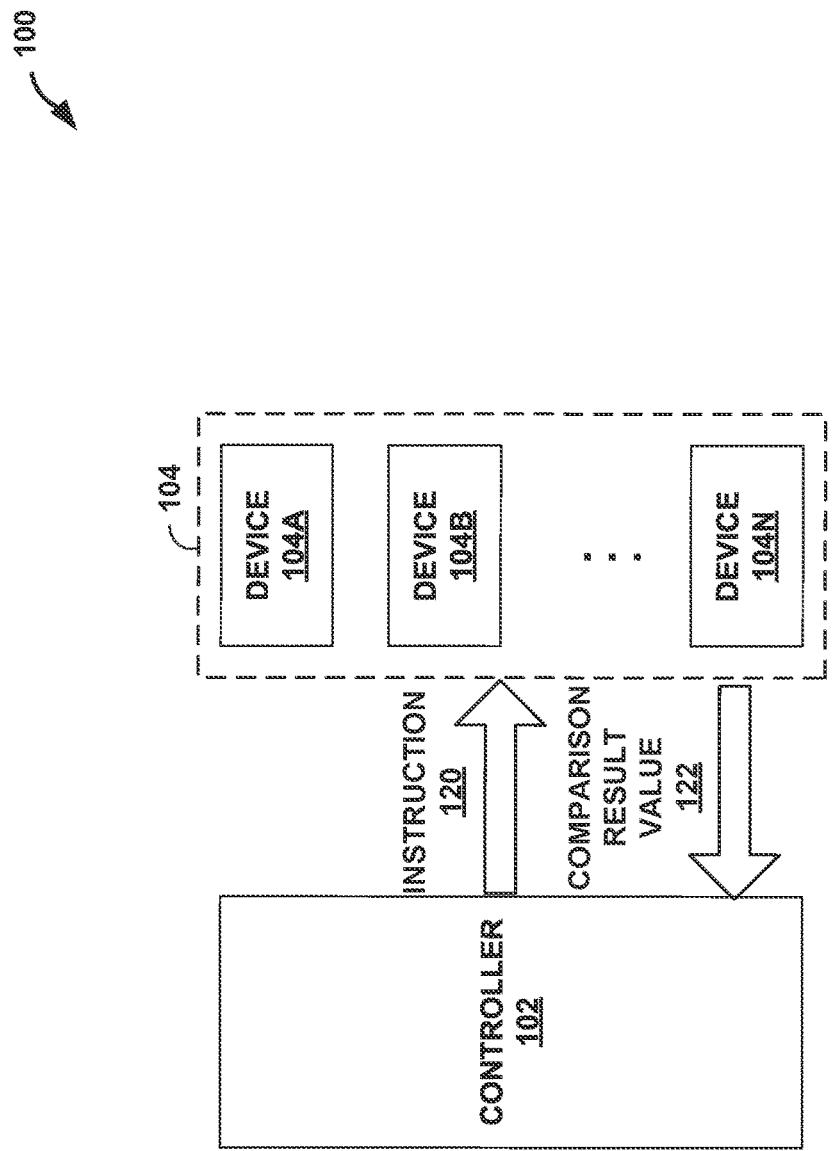
FIG. 1 is a block diagram illustrating an example system configured for communication using a comparison result value, in accordance with one or more techniques of this disclosure.

FIG. 1 is a block diagram illustrating an example system 100 configured for communication using a comparison result value, in accordance with one or more techniques of this disclosure. As shown, system 100 includes controller 102 and devices 104A, 104B, . . . , 104N (collectively "devices 104"), however system 100 may include additional or fewer devices than those shown in FIG. 1. While examples below refer to processes performed by device 104A and 104B, other devices of devices 104 may perform similar processes.

Generally, controller 102 may manage devices 104, which may communicate with each other. For example, devices 104 may be arranged in a daisy chain configuration. In this example, controller 102 may communicate an instruction 120 to device 104A, which forwards instruction 120 to device 104B, and so on to device 104N. In some examples, controller 102 may directly communicate with each one of devices 104 (e.g., without forwarding by other devices of devices 104). For instance, controller 102 may directly output instruction 120 to each one of devices 104 using a bus. In this instance, each one of devices may send a respective comparison result value 122 directly to controller 102 using the bus.

While examples described herein may be directed to automotive battery management systems (e.g., including battery powered vehicles and/or automotive battery systems), techniques described herein may be applicable other battery applications, such as a lithium ion multicell management solution, a cell module system, and/or a logical group of cells supervised by a cell management system or other applications. The series connection of lithium ion cells may use permanent supervision (e.g., a voltage value, a current value, a resistance value, or a temperature value) and charge balancing. To provide supervision, some systems may use multiple cell monitor and/or balancing devices for measurement. A high communication speed can be considered as a performance indicator in the system. Devices arranged in a daisy chain configuration may to be each configured to read out periodically (e.g., reading of a voltage value, a current value, a resistance value, or a temperature value). Periodic reading of diagnostic information may be provided to help provide higher safety requirements for system 100.

Controller 102 may be configured to send write and/or read requests to devices 104 and receive responses from devices 104. Devices 104 may include a microcontroller on a single integrated circuit containing a processor core, memory, inputs, and outputs. For example, device may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, device may be a combination of one or more analog components and one or more digital components.

Devices 104 may be configured to use a communication interface to receive instruction 120 and output comparison result 122 using the communication interface (i.e., the same communication interface). However, in some examples, devices 104 may receive instruction 120 using a first communication interface and output comparison result 122 using a second communication interface different from the first communication interface. For example, one or more of devices 104 may include a first pin configured for the first communication interface and a second pin configured for the second communication interface.

Devices 104 may be configured to generate responses for output to controller 102. In some examples, devices 104 may each include a battery cell circuit of a battery management system. Each battery cell circuit may be associated with a respective battery cell. For example, each one of devices 104 may generate a value for a battery cell. For instance, device 104A may generate a value for a first battery cell and device 104B may generate a value for a second battery cell different from the first battery cell. Devices 104 may be described herein as being configured to generate a response to include a value corresponding to, for example, a voltage value, a current value, a resistance value, or a temperature value for a battery cell. However, in some examples, devices 104 may generate the response to include other values. Each of devices 104 may be a combination of one or more analog components and one or more digital components.

In accordance with the techniques of the disclosure, device 104A may receive, from controller 102, an instruction 120 requesting data for device 104A. Device 104A may determine a comparison result value based on a comparison of the data for device 104A and a reference value. The reference value may include an expected value, which may be part of instruction 120 (e.g., an original broadcast command/request) from controller 102 to devices 104 (e.g., the daisy-chain members). The reference value may comprise one or more of: a prior measurement performed by device 104A, a derived value determined using the prior measurement performed by device 104A and at least one other prior measurement performed by another device of devices 104, a value output by another device of devices 104, or an expected value of instruction 120.

Device 104A may, in some examples, receive the reference value from a second device (e.g., another one of devices 104). In some examples, instruction 120 may include the reference value. Device 104A may determine whether to respond to instruction 120 based on the comparison result value. For example, in response to determining that the comparison result value indicates that the data for device 104A matches comparison result value 122, device 104A may refrain from responding to instruction 120.

In response, however, to a determination to respond to the instruction 120, device 104A may output, to controller 102, comparison result value 122. To output comparison result value 122, device 104A may be configured to refrain from outputting the data for device 104A. For instance, device 104A may output the comparison result value 122 without outputting a complete set of data for device 104A. In some examples, outputting comparison result value 122 may include using a first communication interface used to receive instruction 120. In some examples, device 104A may respond to instruction 120 on a second interface different from the first communication interface.

For example, the reference value may include a hash value. In this example, device 104A may store a register value for device 104A. Device may be configured to generate, using the register value for device 104A stored at the data register, a hash value as the data for device 104A. To determine the comparison result value, device 104A may be configured to determine comparison result value 122 based on a comparison of the generated hash value and the hash value of instruction 120. In this way, the available bandwidth to system 100 may be used more efficiently without loss of information compared to systems that do not use a reference value. In some examples, system 100 may use a communication bandwidth more efficiently and/or increase a performance (e.g. better diagnostic coverage due to faster update periods) compared to systems that do not use a reference value. System 100 may reduce a current consumption compared to systems that do not use a reference value, due to, for example, less time in communication mode. In some examples, system 100 may increase an available bandwidth for additional features (e.g. filtered data and/or impedance measurement results) compared to systems that do not use a reference value.

A battery management system may keep the variation of cell voltages to a minimum. Devices 104 may transfer the voltage information of many cells to controller 102, which in normal conditions and within a limited time may have a limited variation within a series string. Instead of transferring N-times a full-resolution frame for every cell voltage measurement, devices 104 may transfer a reduced resolution value instead. For example, device 104B may include a battery cell circuit of a battery management system. In this example, device 104B may be configured to receive, from a previous battery cell circuit of a plurality of battery cell circuits connected in a daisy chain configuration or ring configuration (e.g., device 104A), instruction 120 requesting a value for the battery cell circuit. For instance, instruction 120 may request a voltage value, a current value, a resistance value, or a temperature value for a battery cell. In this example, device 104B may determine a comparison result value based on a comparison of the value for the battery cell circuit and a reference value. Device 104B may receive the reference value from a second device (e.g., another one of devices 104). For instance, device 104B may receive an indication of a voltage value for a battery cell managed by device 104N that is expected to be similar to a voltage value for a battery cell managed by device 104B. In some examples, the instruction includes the reference value. For instance, device 104B may receive, in instruction 120, an indication of an expected voltage value (e.g., a mean of previous voltage values for battery cells managed by devices 104).

Device 104B may output, to controller 102, comparison result value 122. For example, device 104B may be configured to refrain from outputting the value for the battery cell circuit. For instance, device 104B may output a single bit value indicating that the value for the battery cell circuit matches the reference value (see FIG. 6). In some examples, device 104B may output a difference between the value for the battery cell circuit and the reference value. In this way, the available bandwidth to system 100 may be used more efficiently without loss of information compared to systems that do not use a reference value. In some examples, system 100 may use a communication bandwidth more efficiently and/or increase a performance (e.g. better diagnostic coverage due to faster update periods) compared to systems that do not use a reference value. System 100 may reduce a current consumption compared to systems that do not use a reference value, due to, for example, less time in communication mode. In some examples, system 100 may increase an available bandwidth for additional features (e.g. filtered data and/or impedance measurement results) compared to systems that do not use a reference value.

Figure 2:
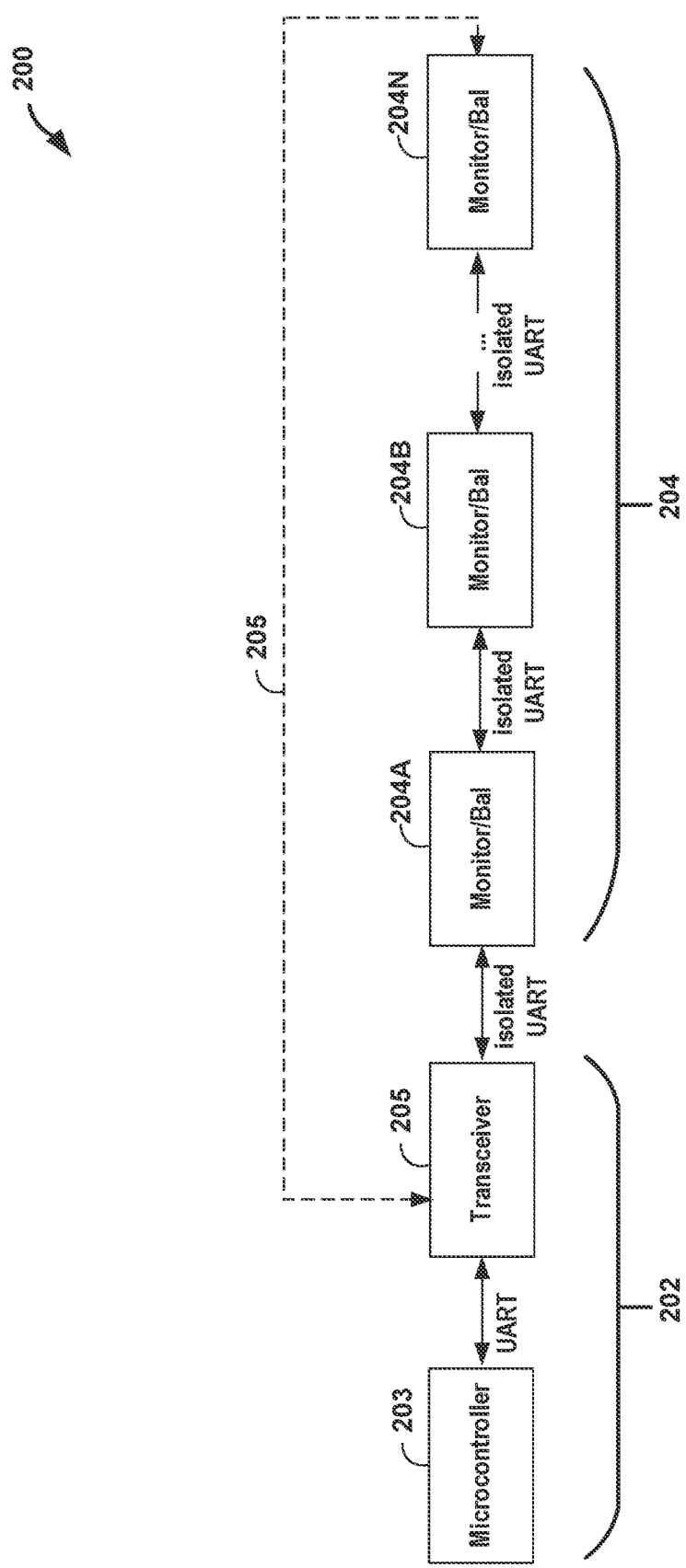
FIG. 2 is an illustration of devices connected in a daisy chain configuration, in accordance with one or more techniques of this disclosure.

FIG. 2 is an illustration of battery cell circuits 204A-204N (collectively, battery cell circuits 204) connected in a daisy chain configuration, in accordance with one or more techniques of this disclosure. Battery cell circuits 204 may be an example of devices 104.

A wired battery management system (BMS) 200 (also referred to herein as simply, "system 200") may include a BMS controller 202 (e.g., a microcontroller 203 communicating via an isolated transceiver 205) and battery cell circuits 204, which may represent a multi-node daisy-chain of monitoring and/or balancing integrated circuits (ICs). Each battery cell circuit of battery cell circuits 204 may be individually addressable (read/write and configuration from BMS controller 202). All battery cell circuits 204 may be addressed at once with broadcast commands, which may be an example of instruction 120 of FIG. 1. Communication in system 200 may be protected (e.g., including error detection and/or correction). In some examples, communication in system 200 may be repeated periodically (e.g. for safety check, diagnosis read-out, and/or measurement data). Communication in system 200 may be (sufficiently) fast in order to serve application requirements, such, as for example, an original equipment manufacturer (OEM) requirement. As shown, system 200 may optionally be configured in a ring-architecture. For example, system 200 may include a return path 205 in communication from device 204B back to BMS controller 202 (also referred to herein as simply "controller 202").

Battery cell circuits may transfer voltage information periodically (e.g. as a 12 channel balancer and/or monitor transfer 12×16 bit payload data per device). In this example, the cell voltage from channel to channel and device to device may deviate but, the absolute values of the cell voltages may be expected to vary (e.g., most of the time) in a reduced voltage corridor compared to the full scale range (e.g., an equal behavior of the cells in a serial string). In this example, battery management system 200 may keep the variation of the cell voltages to a minimum. For instance, cell supervision circuitry (CSC) included in devices 204 may balance the battery cells (e.g., equalize a voltage at the battery cells). Instead of transferring N-times a full-resolution frame for every cell voltage measurement, battery cell circuits 204 may transfer a reduced resolution value instead. In this way, the available bandwidth of system 200 may be used more efficiently without a loss of information.

In accordance with the techniques of the disclosure, a BMS cell management solution may include a communication system that allows for a command to transfer all measurement results from all daisy-chain-members (e.g., devices 204) in an efficient format. In this process of data communication, only the delta to a reference value (e.g., a difference from the reference value) may be transferred by battery cell circuits 204. The reference value may include a prior measurement of the same cell, a buffered value for the purpose of determining a delta in the cell supervision circuitry (e.g., a limited variation over time). In some examples, the reference value may include a mean and/or a derived value from a string measurement. For an example, in a 12 channel measurement solution, a mean value of all measurements may be transferred in the command itself (e.g., variation over series connection). In some examples, the reference value may include a captured communication frame from a neighbouring daisy-chain device (e.g., variation over series connection). For instance, device 204B may capture a response frame from device 204N. Device 204 may determine the reference value from the response frame output by device 204N. The reference value may include an expected value, which may be part of the original broadcast command/request from the controller 202 to the daisy-chain devices 204 (e.g., variation versus expectation). In this way, system 200 may use a reduced amount of bits per transferred message. System 200 may reserve one or more bit combinations to indicate the validity of the transferred data. An increase of representable voltage range can be achieved by, for example, omitting lower least-significant bits (LSBs) of the to be transferred measurement results.

In some examples, battery cell circuits 204 may be configured to support a comparison in a diagnosis reading to distinguish in between, for example, warning flags and error flags. For example, battery cell circuits 204 may, in parallel to the comparison of the reference value of an accumulator-buffer as mask-register, apply a read-command (e.g., a configurable read-command) that executes a logical operation (e.g. a logical AND) with the mask-register and compare the reference value and communicating the result.

In accordance with the techniques of the disclosure, battery cell circuit 204B may be configured to receive, from a previous battery cell circuit of battery cell circuits 204 (e.g., battery cell circuit 204A), an instruction requesting a value for battery cell circuit 204B. Battery cell circuit 204B may output, to a subsequent battery cell circuit of battery cell circuits 204 (e.g., battery cell circuit 204N) the instruction. In this way, battery cell circuit 204B may support battery cell circuits 204 being connected in a daisy chain configuration or ring configuration.

Battery cell circuit 204B may determine a comparison result value based on a comparison of the value for battery cell circuit 204B and a reference value. Battery cell circuit 204B may receive the reference value from second battery cell circuit (e.g., another one of battery cell circuits 204). For instance, battery cell circuit 204B may receive the reference value from battery cell circuit 204N. In this instance, battery cell circuit 204B may receive, from the subsequent battery cell circuit (e.g., battery cell circuit 204N), the reference value and output, to the previous battery cell circuit (e.g., battery cell circuit 204A), the reference value. In this example, the second battery cell circuit (e.g., battery cell circuit 204N) includes the subsequent battery cell circuit (e.g., battery cell circuit 204N). For instance, battery cell circuit 204N is both the last battery cell circuit 204N in a daisy chain configuration and a next battery cell circuit for battery cell circuit 204B in the daisy chain configuration. However, in some examples, the second battery cell circuit is connected to battery cell circuit 204B by the daisy chain configuration or ring configuration using at least the subsequent battery cell circuit. For instance, system 200 may only include 'M' number of battery cell circuits, where 'M' is a positive integer greater than 1, and battery cell circuit 204M is the last battery cell circuit in the daisy chain configuration and battery cell circuit 204N is a next battery cell circuit for battery cell circuit 204B in the daisy chain configuration. In some examples, the instruction includes the reference value. For example, battery cell circuit 204B may receive the reference value in an instruction.

Battery cell circuit 204B may output, to controller 202, the comparison result value. For example, battery cell circuit 204B may be configured to refrain from outputting the value for the battery cell circuit. For instance, battery cell circuit 204B may output a single bit value indicating that the value for the battery cell circuit matches the reference value (e.g., see FIG. 6). In some examples, battery cell circuit 204B may output a difference between the value for the battery cell circuit and the reference value.

Figure 3:
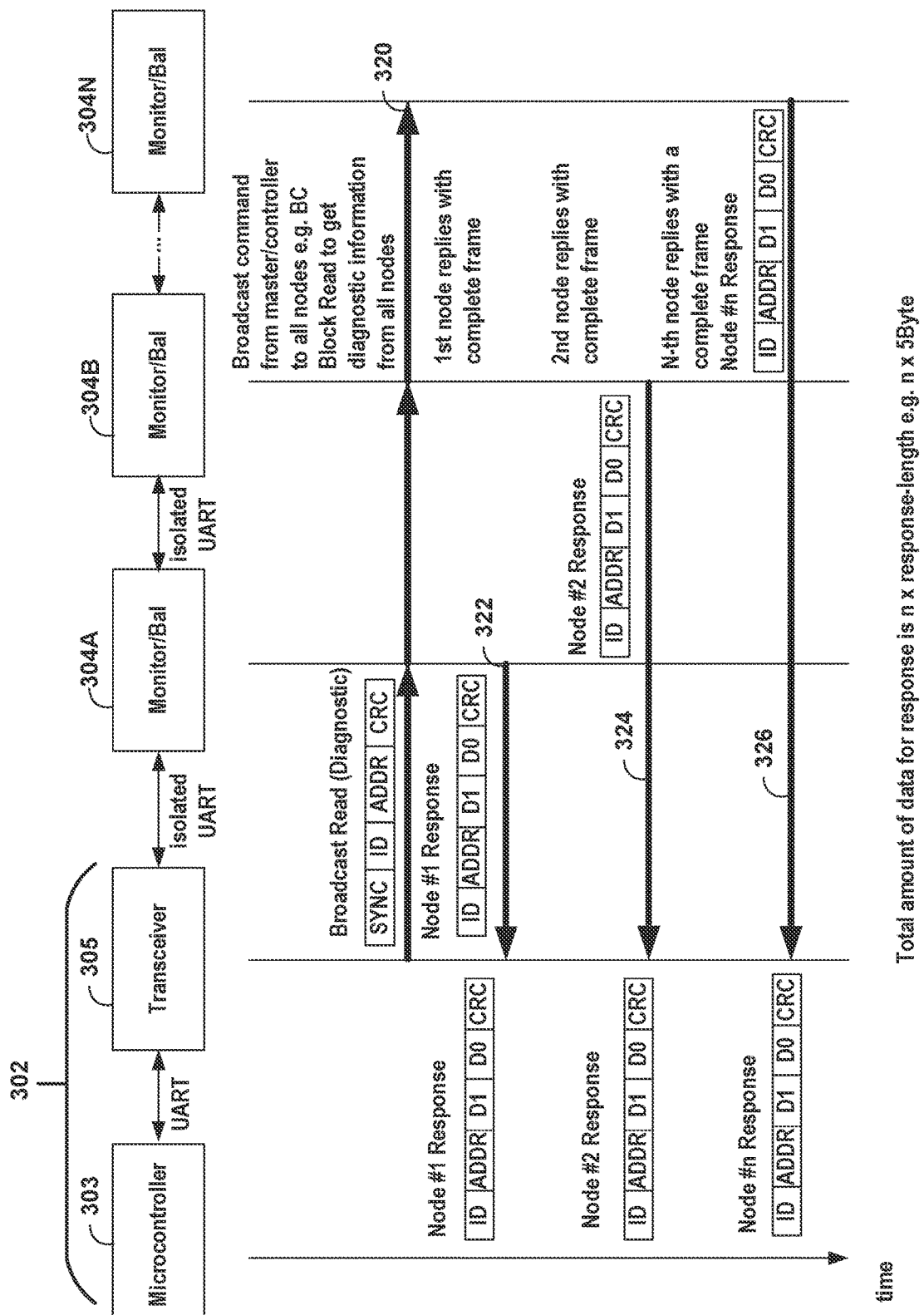
FIG. 3 is a conceptual diagram of devices connected in a daisy chain configuration responding to an instruction requesting data.

FIG. 3 is a conceptual diagram of devices 304A-304N (collectively, devices 304) connected in a daisy chain configuration responding to an instruction requesting data. Controller 302 may include a microcontroller 303 communicating via an isolated transceiver 305.

Controller 302 may send a broadcast command to all devices 304, for example, a broadcast (BC) block read to get diagnostic information from all devices 304 (320). In this example, device 304A may respond to with a complete frame (322). Device 304B may respond to with a complete frame (324) and device 304N may respond to with a complete frame (326). A total amount of data for the responses from devices 304 is 'N' times a response-length (e.g. N×5 byte), where 'N' is a number of devices 304 (i.e., 'N' is a positive integer greater than 1).

There may be an expected result for the reading that applies most of the time (e.g., under normal operating conditions). In diagnostic frames, only in case of failure, a flag would be set, otherwise an equal frame may be expected from all devices 304. A daisy-chain of devices 304 comprised of identical nodes can be identified by their node ID. In this example, a sequence of node IDs in the daisy chain is known by controller 302 (e.g., an enumeration done by controller 302), thus the sequence of response frames can be assign to devices 104.

Figure 4:
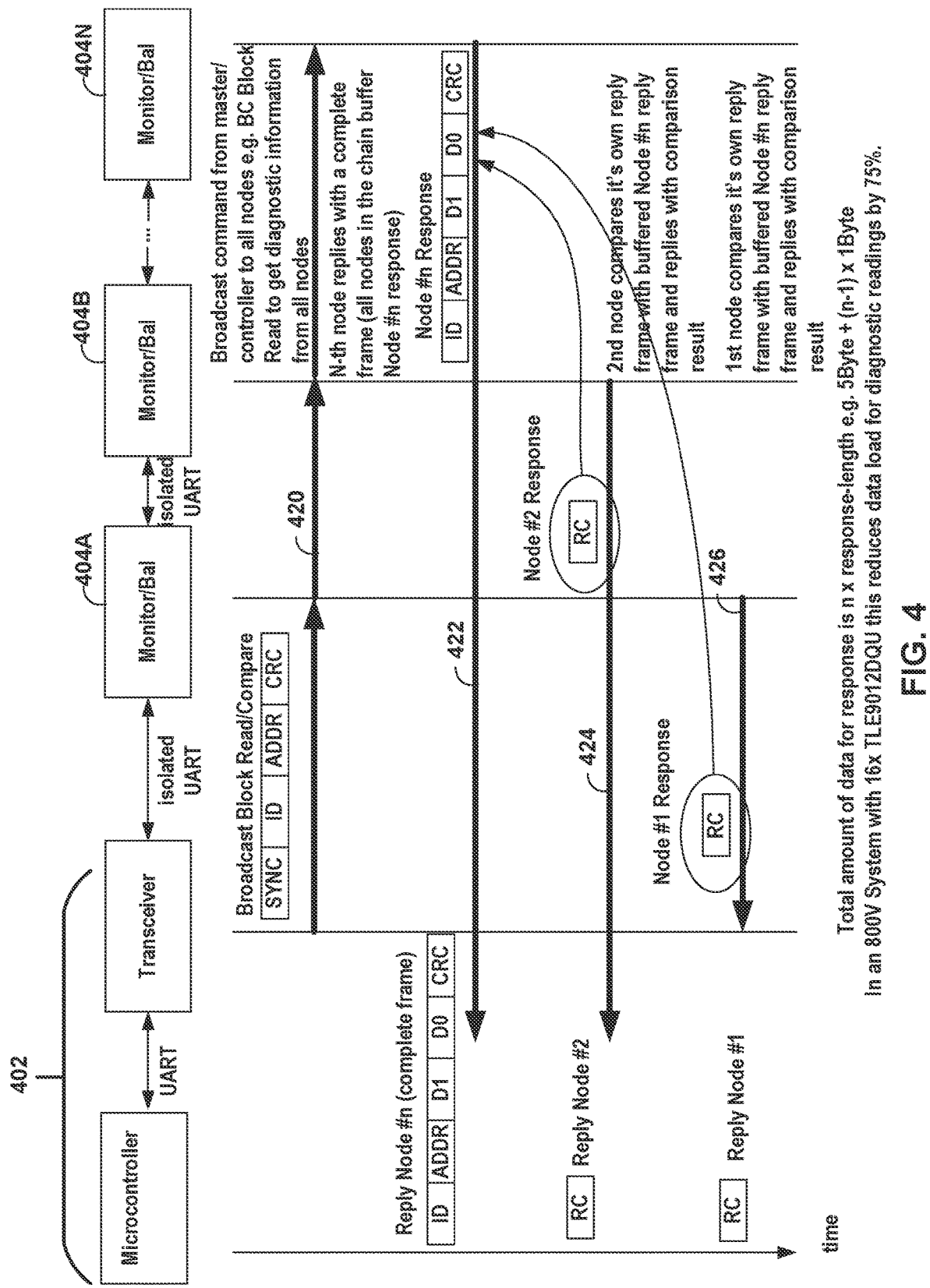
FIG. 4 is a conceptual diagram of devices connected in a daisy chain configuration responding to an instruction requesting data using a comparison result value determined based on a reference value indicated in a reply to the instruction, in accordance with one or more techniques of this disclosure.

FIG. 4 is a conceptual diagram of devices 404A-404N (collectively, devices 404) connected in a daisy chain configuration responding to an instruction requesting data using a comparison result value determined based on a reference value indicated in a reply to the instruction, in accordance with one or more techniques of this disclosure. Controller 402 may include a microcontroller 403 communicating via an isolated transceiver 405.

In the example of FIG. 4, communication commands may be extended to include a broadcast command "broadcast block read/compare." Controller 402 may send the broadcast block read/compare command to all daisy chain nodes (e.g., devices 404) to read a specified register address but instead of responding with a complete frame, only the information if the data deviates from a buffered or expected data frame will be sent (420). For example, the reference value can be provided by the response from the n-th node (e.g., device 404N) that is sent through the complete daisy chain after the reception of the "broadcast block read/compare" command and devices may be buffered in all daisy-chain nodes. In case of deviation from expected value, device 404A, 404B could automatically send the reference value as a full-frame with all data. For example, device 404N may reply with a complete frame (422) and devices 404A, 404B buffer the response from device 404N as a reference value. In this example, device 404B may compare a value for device 404B with the buffered reference value from device 404N and reply with a comparison result (424). Device 404A may compare a value for device 404A with the buffered reference value from device 404N and reply with a comparison result (426). A total amount of data for response is 'N' times a response-length (e.g. 5 Byte+(n−1)×1 Byte). In a 800V System with 16× channels, techniques illustrated in FIG. 4 may reduce data load for diagnostic readings by 75%. As described in further details with FIG. 5, controller deice 402 may include the reference value in the broadcast block read/compare command itself.

In case the first replying node (e.g., the response from device 404N) has a deviating reply, device 402 may not assume that all other devices have the "normal operation" reply because only the information that they deviate was sent. In this example, device 402 may repeat a read command to verify content of all devices 404. In some examples, devices 404A, 404B may output a single (addressed) read in case one node was replying with a deviating data word. In both implementations, devices 404 may repeat at least a single read operation for the deviating data frame. Instead of transferring only the comparison result, devices 404 could be implemented to transfer the complete deviating data frame instead of a comparison result value. An advantage of transferring the complete deviating data frame is that device 402 may not necessarily output an additional read request to read deviating data. However, configuring devices 404 to transfer the complete deviating data frame may result in a non-deterministic read-sequence as multiple nodes could either reply with a short response or a full frame.

Figure 5:
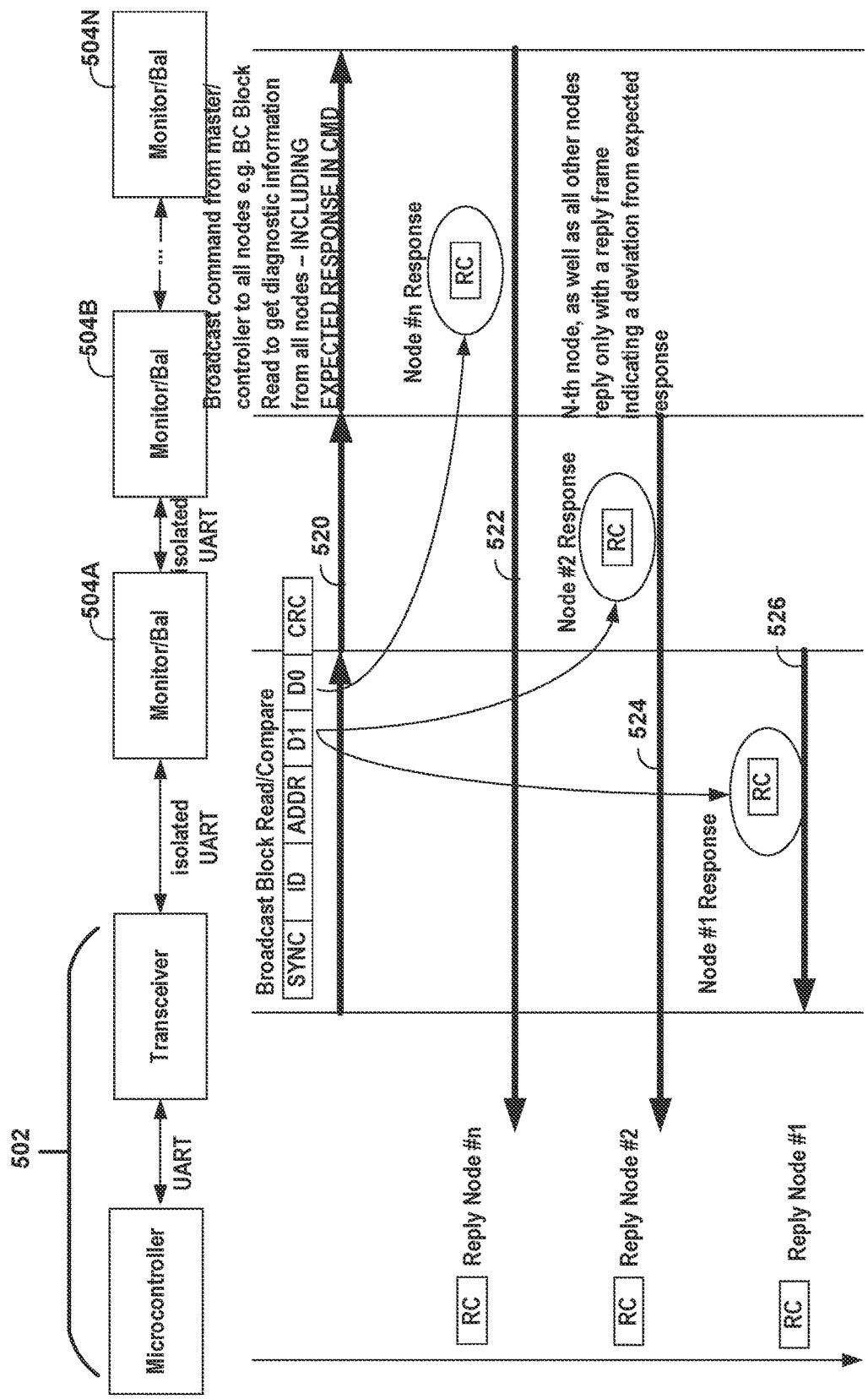
FIG. 5 is a conceptual diagram of devices connected in a daisy chain configuration responding to an instruction requesting data using a comparison result value determined based on a reference value indicated in the instruction, in accordance with one or more techniques of this disclosure.

FIG. 5 is a conceptual diagram of devices 504A-504N (collectively, devices 504) connected in a daisy chain configuration responding to an instruction requesting data using a comparison result value determined based on a reference value indicated in the instruction, in accordance with one or more techniques of this disclosure. Controller 502 may include a microcontroller 503 communicating via an isolated transceiver 505.

In the example of FIG. 5, the reference value can be part of the "Broadcast Block Read/Compare" Command. For example, controller 502 may send the broadcast block read/compare command that includes a reference value to all daisy chain nodes (e.g., devices 504) to read a specified register address but instead of responding with a complete frame, only the information if the data deviates from a buffered or expected data frame will be sent (520). In case of deviation from expected value, device 504A, 504B could automatically send the reference value as a full-frame with all data. For example, device 504N may compare a value for device 504N with the reference value included in the instruction and reply with a comparison result (522). Device 504B may compare a value for device 504B with the reference value included in the instruction and reply with a comparison result (524). Device 404A may compare a value for device 504A with the reference value included in the instruction and reply with a comparison result (526).

Figure 6:
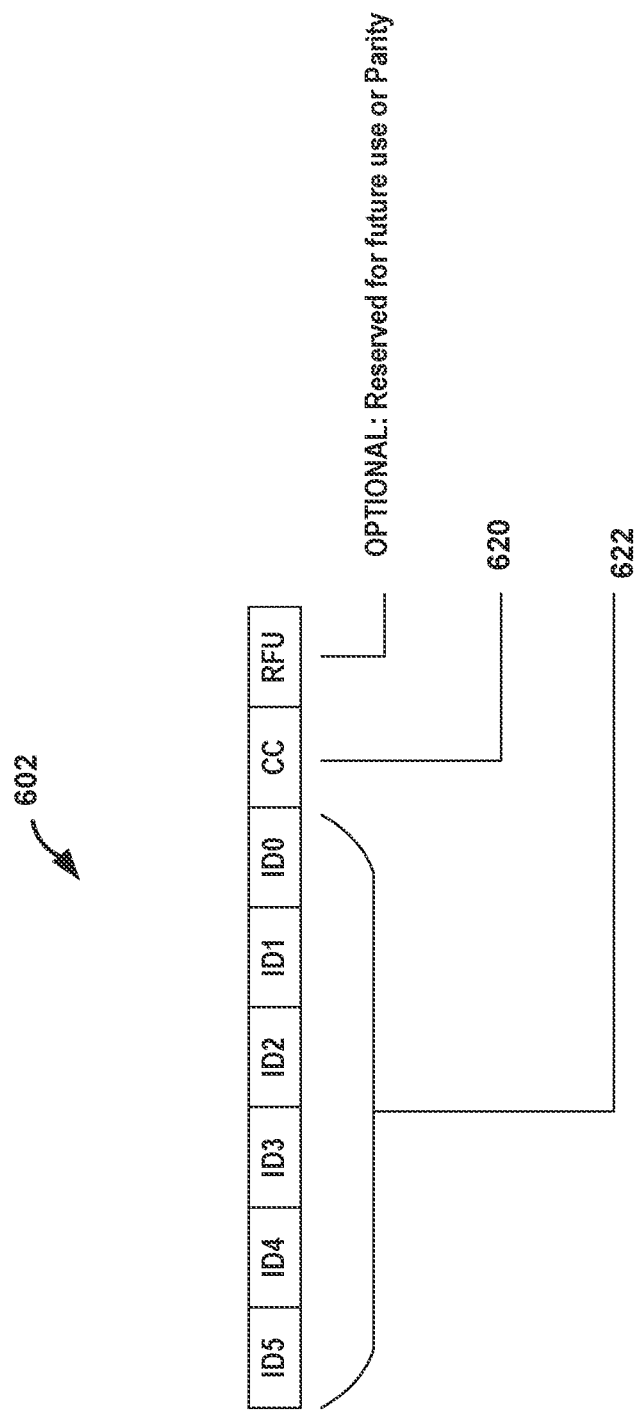
FIG. 6 is a conceptual diagram of an example frame outputting a comparison result value, in accordance with one or more techniques of this disclosure.

FIG. 6 is a conceptual diagram of an example frame 602 outputting a comparison result value, in accordance with one or more techniques of this disclosure. Frame 602 may include a comparison result value (CC) 620 and a node identifier 622 of sender. Comparison result value 620 may include only a single bit. In some examples, comparison result value 620 may include a plurality of bit values. Node identifier 622 may comprise a unique address assigned to a sender device of devices 104 that sent frame 602. Controller 102 may assign each one of devices 104 a unique address. The comparison result value 620 may comprise a comparison bit indicating if the data for the sender devices is identical with a reference value. In some examples, frame 602 may include a reserved bit or plurality of bits for future use and/or parity.

Any bit fault in such a frame can be detected by controller 102 because the sequence of node IDs may be known by controller 102 so any missing frame or bit fault would violate the expected sequence of ID[5 . . . 0] part of the response. A bit fault of the comparison result (CC) would indicate a deviation from expected frame. In that case, the full data frame from the respective node ID may be read completely by controller 102 in a further command to identify error flag or verify that there is really a flag set.

Figure 7:
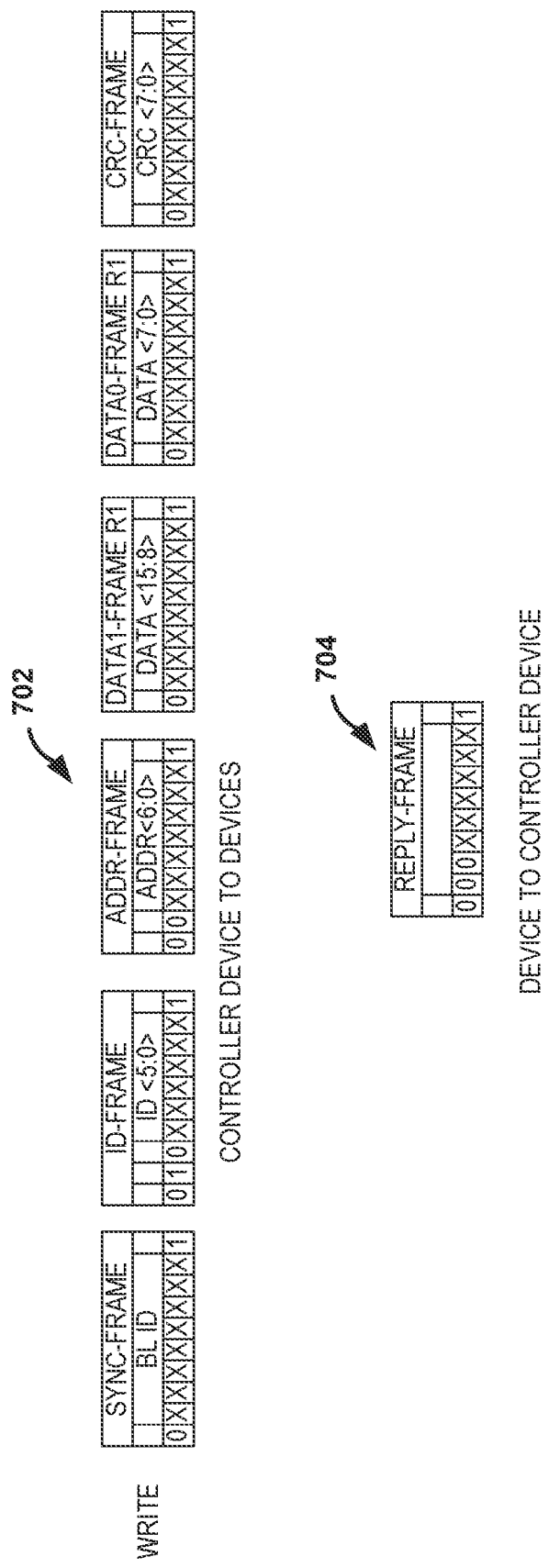
FIG. 7 is a conceptual diagram of an example first frame, in accordance with one or more techniques of this disclosure.

FIG. 7 is a conceptual diagram of an example first frame 702, in accordance with one or more techniques of this disclosure. In this example, devices 104 may output, to devices 104, frame 702 to write a single 16 bit register in a single (addressable) node. In response to frame 702, device 104A may output frame 704 after a time delay.

Figure 8:
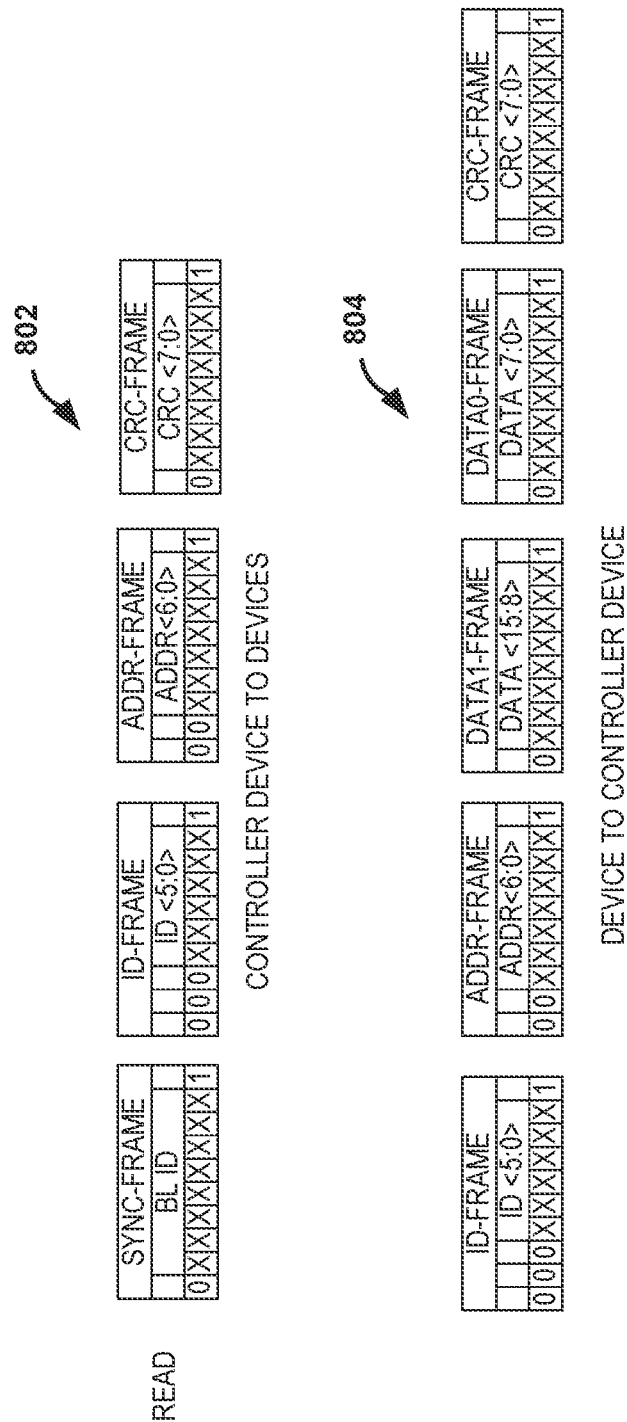
FIG. 8 is a conceptual diagram of an example second frame, in accordance with one or more techniques of this disclosure.

FIG. 8 is a conceptual diagram of an example second frame 802, in accordance with one or more techniques of this disclosure. In the example of FIG. 8, controller 102 may output, to devices 104, frame 802 to read a single 16 bit register in a single (addressable) node. In response to frame 702, device 104 may output frame 804.

Figure 9:
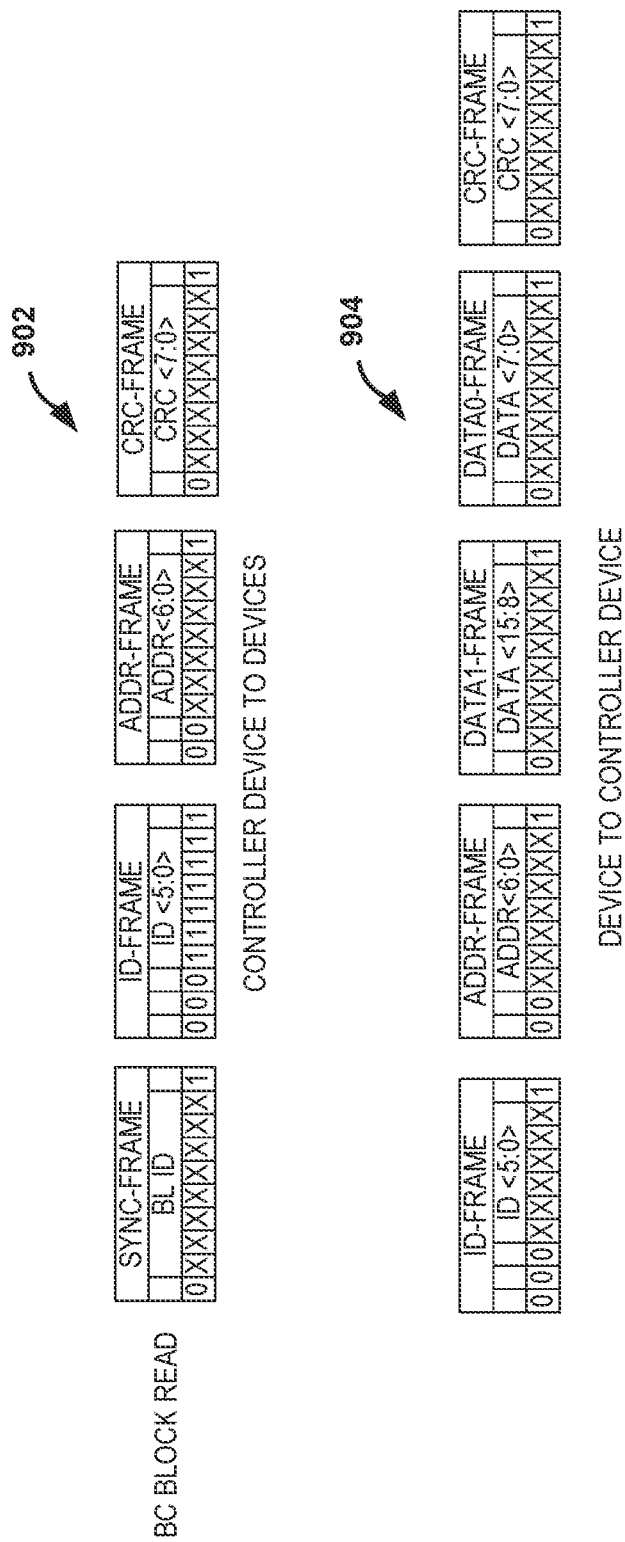
FIG. 9 is a conceptual diagram of an example third frame, in accordance with one or more techniques of this disclosure.

FIG. 9 is a conceptual diagram of an example third frame 902, in accordance with one or more techniques of this disclosure. Controller 102 may output an instruction to perform a multi-read register(s) operation. For example, controller 102 may output a frame 902 to include an instruction to read multiple 16 bit registers in a single (addressable) node. In some examples, controller 102 may output a frame with an instruction to broadcast a write operation. For example, controller 102 may output an instruction to write a single 16 bit register in all devices of a daisy-chain.

In the example of FIG. 9, controller 102 may output frame 902 to include an instruction to broadcast a block read operation. For example, controller 102 may output an instruction to read a single 16 Bit register in all devices of a daisy-chain. Each device in the daisy-chain (e.g., devices 104) may reply with frame 904 with a 5 byte response.

In some examples, a broadcast block read operation of frame 902 may cause controller 102 to read diagnostic information from all devices 104 (e.g., periodically). For example, a battery system for 800 V may include 16 devices would transfer 5 bytes×16 devices=80 bytes for each diagnostic frame to be transferred. However, in this battery system example, most of the time this information (e.g., a cell voltage) may be identical indicating proper operation of the complete chain. Communication speed and update periods may be an important performance indicator of system 100. For example, faster reading and/or a higher communication speed of system 100 may result in an improved performance of system 100.

Figure 10:
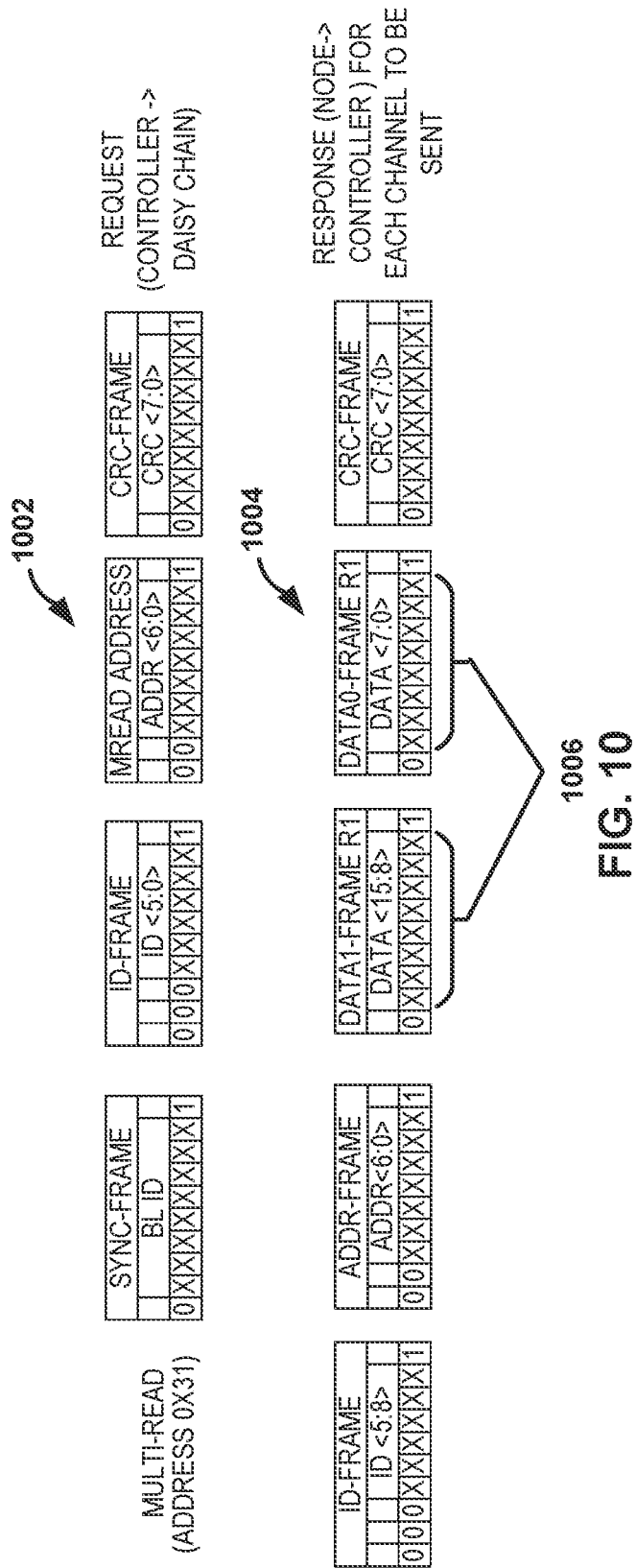
FIG. 10 is a conceptual diagram of an example fourth frame, in accordance with one or more techniques of this disclosure.

FIG. 10 is a conceptual diagram of an example fourth frame, in accordance with one or more techniques of this disclosure. FIG. 10 illustrates a request 1002 and a response 1004 with a payload 1006 arranged in a 2×8 bit format. In the example of FIG. response 1006 may be generated for each device (e.g., devices 104).

Figure 11:
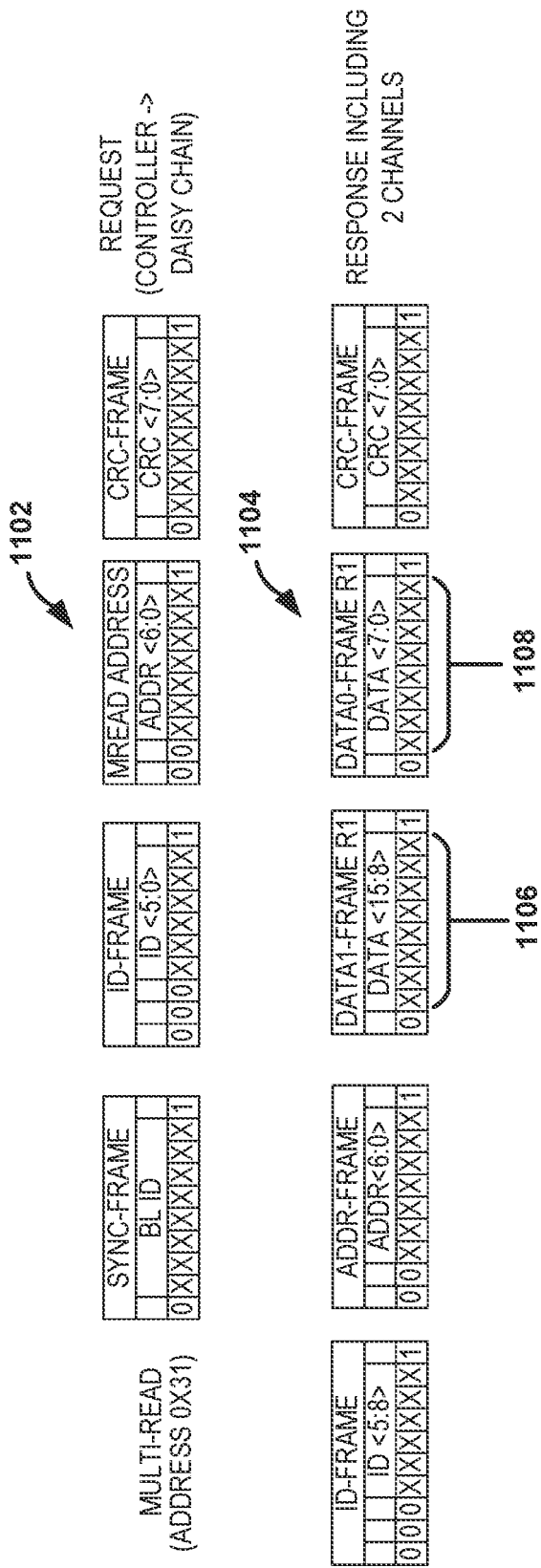
FIG. 11 is a conceptual diagram of an example fifth frame, in accordance with one or more techniques of this disclosure.

FIG. 11 is a conceptual diagram of an example fifth frame, in accordance with one or more techniques of this disclosure. FIG. 11 illustrates a request 1102, which is consistent with request 1002 of FIG. 10. However, response 1104 comprises both payload 1106 arranged in a 1×8 bit format for a first node (e.g., a cell voltage for node #(n−1) and payload 1108 arranged in a 1×8 bit format for a second node (e.g., a cell voltage for node #(n−2).

In the example of FIG. 11, a delta value with a 8 bit width can represent a voltage range of 255×LSB-resolution. In some examples, devices 104 may indicate if this range is exceeded (e.g. by reserving bit combinations). For instance, devices 104 may be configured to reserve the bit combination 0xFF to indicate a higher voltage than representable in a voltage range of 255×LSB-resolution. In some instances, devices 104 may be configured to reserve the bit combination 0x00 to indicate a lower voltage than representable in a voltage range of 255×LSB-resolution. In this instance, devices 104 may represent a voltage value from 0x01 . . . 0xFE to represent a signed delta value from a reference value.

In this way, frame 1104 may include, for example, 2 words per message with half the resolution compared to systems that do not use a reference value. In the example of FIG. 11, a value of 0x80 could indicate that the received cell voltage is identical with the expected 16 bit value, 0x81 may be a leveraged voltage by 1 LSB and 0x7F may be a decreased voltage by 1 LSB; and 0xFF and 0x00 may indicate an out-of-range value.

Figure 12:
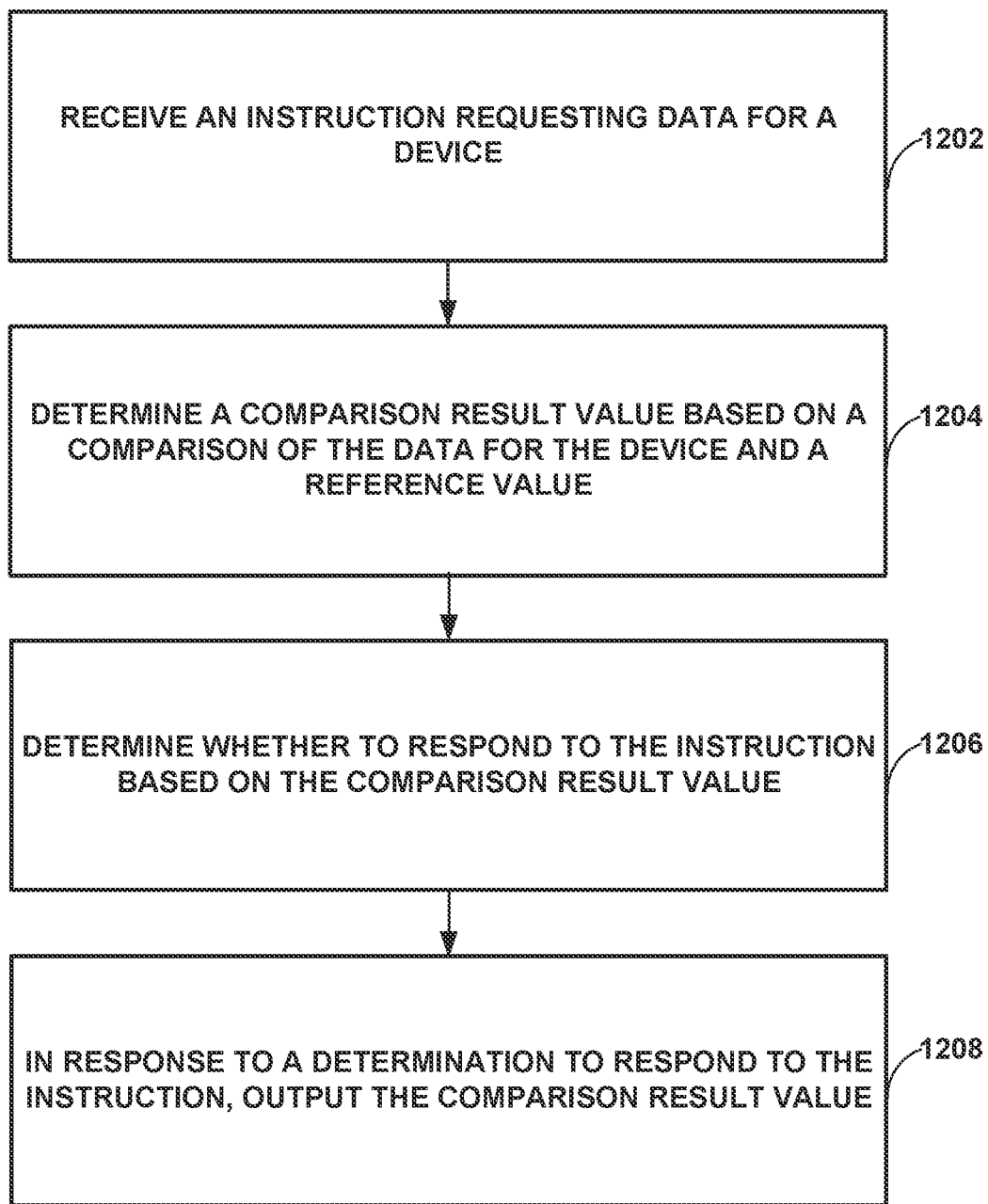
FIG. 12 is a first flow diagram consistent with techniques that may be performed by a device, in accordance with this disclosure.

FIG. 12 is a first flow diagram consistent with techniques that may be performed by a device, in accordance with this disclosure. FIG. 12 is discussed with FIGS. 1-11 for example purposes only.

Device 104A may receive, from controller 102, instruction 120 requesting data for device 104A (1202). Device 104A may determine a comparison result value based on a comparison of the data for device 104A and a reference value (1204). For example, device 104A may receive the reference value from a second device (e.g., another one of devices 104). In some examples, the instruction includes the reference value. The reference value may comprise a hash value (e.g., a cyclic redundancy check (CRC) value). In some examples, the reference value may comprise one or more of: a prior measurement performed by the device, a derived value determined using the prior measurement performed by the device and at least one other prior measurement performed by another device, a value output by another device, or an expected value of the instruction.

Device 104A may determine whether to respond to instruction 120 based on the comparison result value (1206). For example, in response to determining that the comparison result value indicates that the data for device 104A matches the comparison result value, device 104A may refrain from responding to instruction 120. In some examples, device 104A may output the comparison result value when the data for the device does not match the reference value.

In an example where the reference value is a hash value, device 104A may store a register value for device 104A. In this example, device 104A may be configured to generate, using the register value for device 104A stored at the data register, a hash value as the data for the device. For instance, device 104A may apply a hash function to the register value stored at the data register. Device 104A may determine the comparison result value based on a comparison of the generated hash value and the hash value of the instruction. For example, device 104A may determine the comparison result value to be a difference between the hash value of the instruction and the hash value generated using the register value.

In response to a determination to respond to the instruction 120, device 104A may output, to controller 102, the comparison result value (1208). To output the comparison result value, device 104A may be configured to refrain from outputting the data for device 104A.

Device 104A may be configured to determine the comparison result value as a first value (e.g., a logical 1 or 0; or a first predetermined plurality of bits) when the data for the device matches the reference value. Similarly, device 104A may be configured to determine the comparison result value as a second value (e.g., a logical 0 or 1; or a second predetermined plurality of bits) when the data for the device does not match the reference value. For example, device 104A may be configured to determine the comparison result as a single bit (e.g., a logical '1' or '0').

In some examples, device 104A may be configured to determine the comparison result value as a difference between the data for the device and the reference value. For example, device 104A may be configured to determine the comparison result value as the reference value minus the data for the device.

Device 104A may receive the instruction using a communication interface and output the comparison result using the communication interface (i.e., the same communication interface). For example, the communication interface may use a plurality of devices connected in a daisy chain configuration or a ring configuration (see FIG. 2). However, in some examples, device 104A may receive the instruction using a first communication interface and output the comparison result using a second communication interface different from the first communication interface. For example, device 104A may include a first pin configured for the first communication interface and a second pin configured for the second communication interface.

Figure 13:
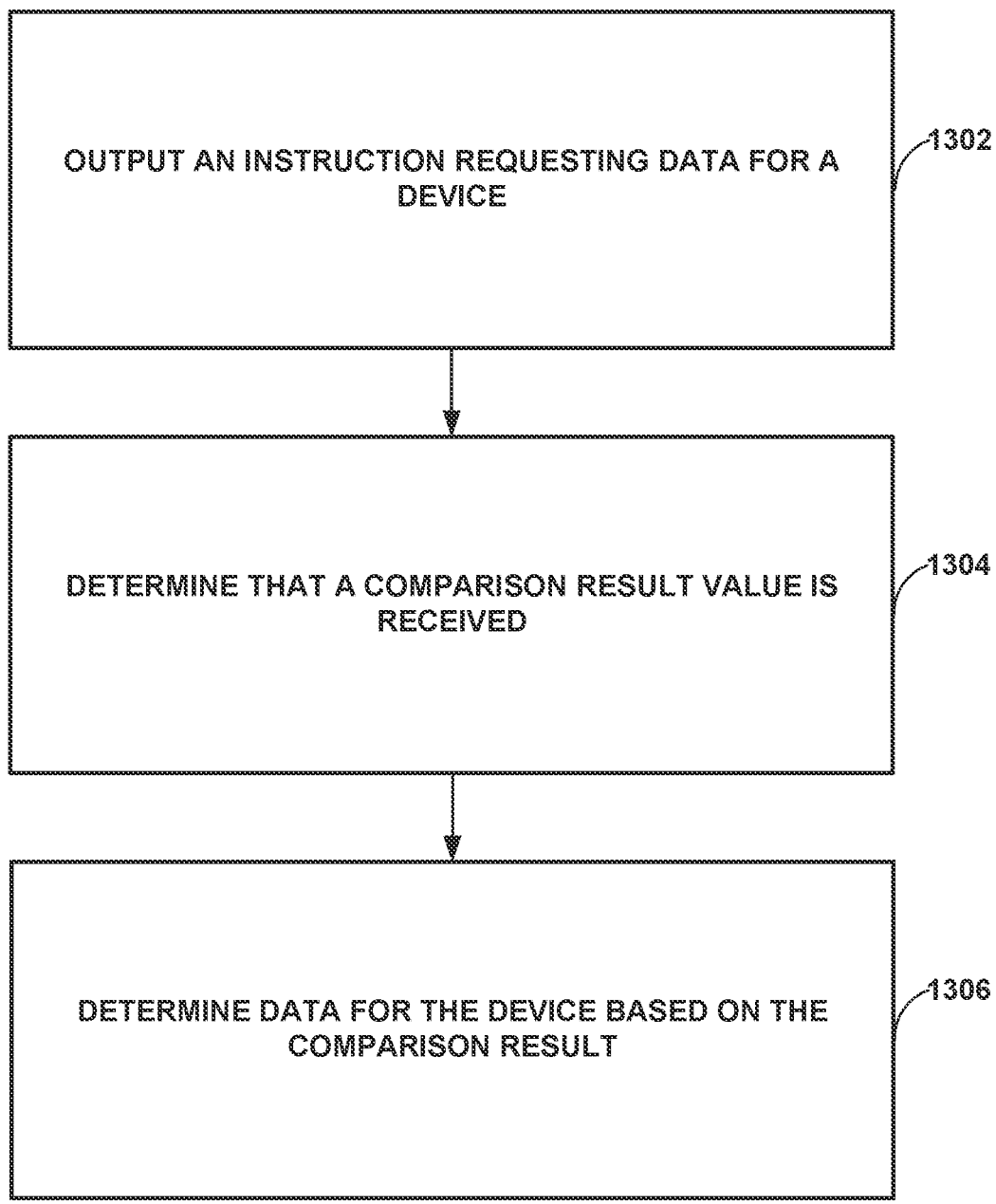
FIG. 13 is a second flow diagram consistent with techniques that may be performed by a device, in accordance with this disclosure.

FIG. 13 is a second flow diagram consistent with techniques that may be performed by a device, in accordance with this disclosure. FIG. 13 is discussed with FIGS. 1-12 for example purposes only.

Controller 102 may output an instruction requesting data for a device (1302). For example, controller 402 of FIG. 4 may output a broadcast command and device 404N may respond with reference information. In some examples, controller 502 of FIG. 5 may output a broadcast command that includes a reference value. Controller 102 may determine that a comparison result value is received (1304). For example, controller 102 may receive a comparison result value within a certain period of time. If no response is received from device 104A within a certain period of time, controller 102 may determine that no comparison result value is received and that the data for device 104A matches the reference information (e.g., output by device 104N or included in the instruction output by controller 102).

Controller 102 may determine data for the device based on the comparison result (1306). For example, controller 102 may determine that the data for device 104A matches the reference value when the comparison result includes an indication (e.g., a single bit or a plurality of bits) that the data for device 104A matches the reference value. In some examples, controller 102 may determine that the data for device 104A by adding the reference value to the comparison result.

Figure 14:
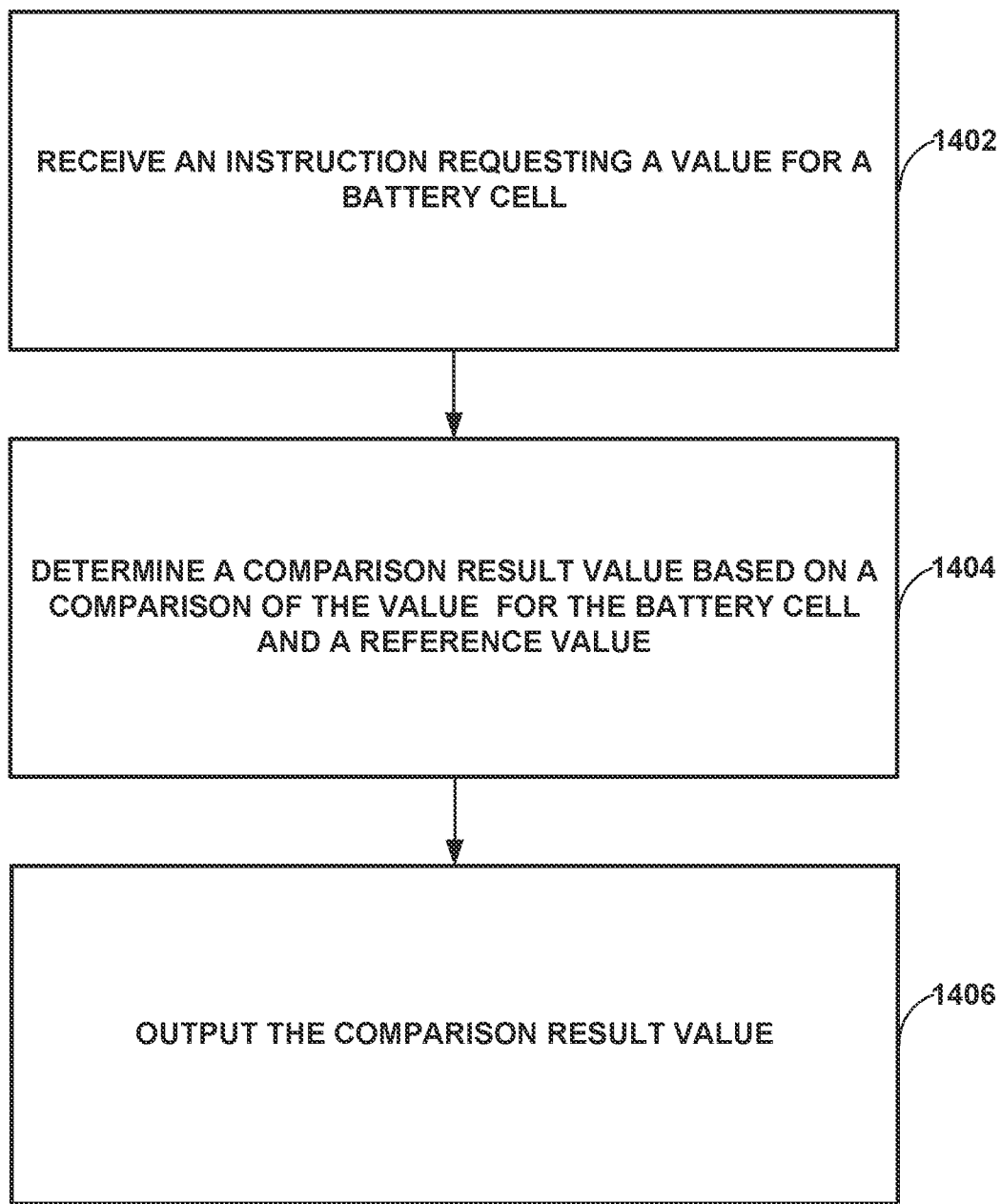
FIG. 14 is a third flow diagram consistent with techniques that may be performed by a device, in accordance with this disclosure.

FIG. 14 is a third flow diagram consistent with techniques that may be performed by a device, in accordance with this disclosure. FIG. 14 is discussed with FIGS. 1-13 for example purposes only.

Battery cell circuit 204B may be configured to receive an instruction requesting a value for a battery cell (1402). Battery cell circuit 204B may receive the instruction from previous battery cell circuit (e.g., battery cell circuit 204A) connected in a daisy chain configuration or ring configuration (see FIG. 2). For instance, the instruction may request a voltage value, a current value, a resistance value, or a temperature value for a battery cell.

Device 104B may determine a comparison result value based on a comparison of the value for the battery cell circuit and a reference value (1404). Device 104B may receive the reference value from a second device (e.g., another one of devices 104). In some examples, the instruction includes the reference value.

Device 104B may output the comparison result value (1406). For example, device 104B may be configured to refrain from outputting the value for the battery cell circuit. For instance, device 104B may output a single bit value indicating that the value for the battery cell circuit matches the reference value (see FIG. 6). In some examples, device 104B may output a difference between the value for the battery cell circuit and the reference value.

Battery cell circuits 204 may be connected in a daisy chain configuration or ring configuration. For example, battery cell circuit 204B may be configured to receive the reference value from a second battery cell circuit of the plurality of battery cell circuits (e.g., battery cell circuit 204N) connected in the daisy chain configuration or ring configuration.

Battery cell circuit 204B may output, to a subsequent battery cell circuit of the plurality of battery cell circuits connected in the daisy chain configuration or ring configuration (e.g., battery cell circuit 204N), the instruction. In some examples, battery cell circuit 204B may receive, from the subsequent battery cell circuit, the reference value. Battery cell circuit 204B may output, to the previous battery cell circuit (e.g., battery cell circuit 204A), the reference value. The second battery cell circuit (e.g., battery cell circuit 204N) may include the subsequent battery cell circuit (e.g., battery cell circuit 204N). For instance, battery cell circuit 204N may be both the last battery cell circuit 204N in a daisy chain configuration and a subsequent battery cell circuit for battery cell circuit 204B in the daisy chain configuration. However, in some examples, the second battery cell circuit is connected to battery cell circuit 204B by the daisy chain configuration or ring configuration using at least the subsequent battery cell circuit. For instance, system 200 may include 'M' number of battery cell circuits and battery cell circuit 204M is the last battery cell circuit in the daisy chain configuration and battery cell circuit 204N is a next battery cell circuit for battery cell circuit 204B in the daisy chain configuration.

The comparison result value may comprise a value (e.g., a single bit value or a plurality of logical values). For example, battery cell circuit 204B may determine the comparison result value as a first value (e.g., a logical 1 or 0) when the value for the battery cell circuit matches the reference value. The first value may be a single bit. In some examples, the first value may be a plurality of bit values. In some examples, battery cell circuit 204B may determine the comparison result value as a second value (e.g., a logical 0 or 1) when the value for the battery cell circuit does not match the reference value. The second value may be a single bit. In some examples, the second value may be a plurality of bit values. For example, the value for the battery cell circuit may include diagnostic data of a register value. In this example, controller 202 may benefit from receiving an indication that the diagnostic data or register data does not match the reference value.

In some examples, however, battery cell circuit may determine the comparison result value as a difference between the value for battery cell circuit 204B and the reference value. For example, the value for the battery cell circuit may include a voltage value, a current value, a resistance value, or a temperature value. In this example, controller 202 may benefit from receiving an indication of the difference between the value for battery cell circuit 204B and the reference value. For instance, the reference value may represent an expected value. In some instances, the reference value may include a previously output value of the value for battery cell circuit 204B and/or a received value.

Battery cell circuit 204B may output the comparison result value as part of a frame. For example, battery cell circuit 204B may output a frame comprising the comparison result value as a single bit. Battery cell circuit 204B may output a frame including the single bit and a node identifier assigned to battery cell circuit 204B. For instance, battery cell circuit 204B may output frame 602 comprising the comparison result value 620 as a single bit and node identifier 622. In some examples, battery cell circuit 204B may output a frame comprising the comparison result value as a plurality of bit values (see payloads 1106 and payload 1108 of FIG. 11). In some examples, the frame may comprise a node identifier assigned to the battery cell circuit.

Figure 15:
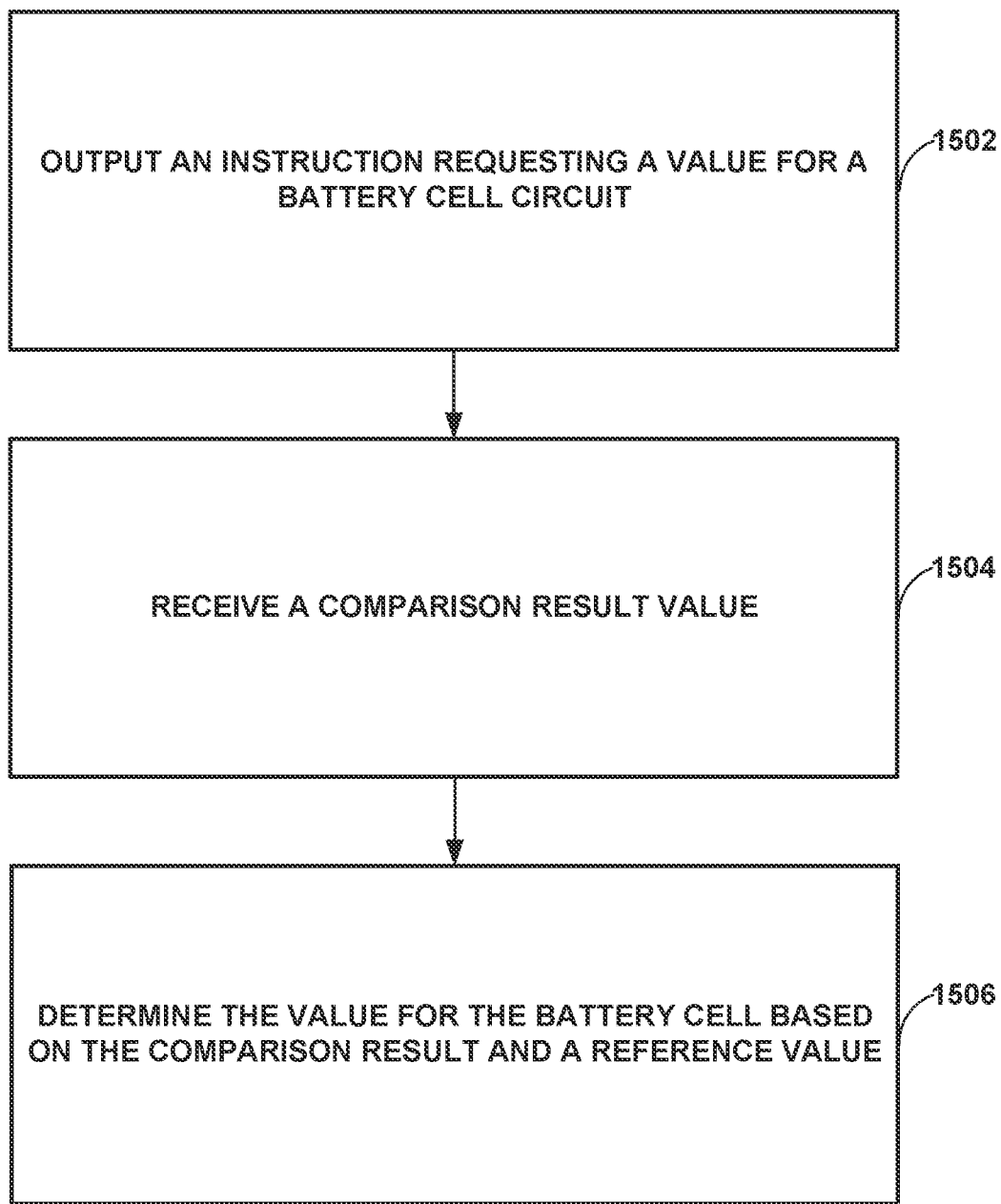
FIG. 15 is a fourth flow diagram consistent with techniques that may be performed by a device, in accordance with this disclosure.

FIG. 15 is a fourth flow diagram consistent with techniques that may be performed by a device, in accordance with this disclosure. FIG. 15 is discussed with FIGS. 1-14 for example purposes only.

Controller 202 may output an instruction requesting a value for a battery cell circuit (1502). Controller 202 may receive a comparison result value (1504). Controller 202 may determine a value for the battery cell circuit based on the comparison result value and a reference value (1506).

For example, controller 202 may determine the value as the reference value when the comparison result value indicates the value for the battery cell circuit matches the reference value. For instance, controller 202 may determine the value (e.g., a resistance value) is a previously output value of the value for battery cell circuit 204B when comparison result value 620 is set to a first value (e.g., a logical '1' or '0'). In some instances, controller 202 may determine the value (e.g., a cell voltage value) is a value of the value for battery cell circuit 204N when comparison result value 620 is set to a first value (e.g., a logical '1' or '0').

In some examples, controller 202 may determine the value as the reference value modified by the comparison result value. For instance, controller 202 may determine the value (e.g., a temperature value) is a previously output value of the value for battery cell circuit 204B modified (e.g., a summation of) by the comparison result value indicated by payload 1106 of FIG. 11.

The following clauses may illustrate one or more aspects of the disclosure.

Clause A1. A device configured to: receive, from a controller, an instruction requesting data for the device; determine a comparison result value based on a comparison of the data for the device and a reference value; determine whether to respond to the instruction based on the comparison result value; and in response to a determination to respond to the instruction, output, to the controller, the comparison result value, wherein, to output the comparison result value, the device is configured to refrain from outputting the data for the device.

Clause A2. The device of clause A1, wherein the device is further configured to receive the reference value from a second device.

Clause A3. The device of clause A1, wherein the instruction comprises the reference value.

Clause A4. The device of clause A3, wherein the reference value comprises a hash value.

Clause A5. The device of clause A4, further comprising a data register configured to store a register value for the device, wherein the device is configured to generate, using the register value for the device stored at the data register of the device, a hash value as the data for the device; and wherein, to determine the comparison result value, the device is configured to determine the comparison result value based on a comparison of the generated hash value and the hash value of the instruction.

Clause A6. The device of clauses A1-A5, wherein, to determine the comparison result value, the device is configured to determine the comparison result value as a first value when the data for the device matches the reference value.

Clause A7. The device of clause A6, wherein, to determine the comparison result value, the device is configured to determine the comparison result value as a second bit value when the data for the device does not match the reference value.

Clause A8. The device of clauses A1-A7, wherein the device is configured to output the comparison result value when the data for the device does not match the reference value.

Clause A9. The device of clauses A1-A8, wherein the device is configured to receive the instruction using a communication interface; and wherein the device is configured to output the comparison result value using the communication interface.

Clause A10. The device of clause A9, wherein the communication interface uses a plurality of devices connected in a daisy chain configuration or a ring configuration.

Clause A11. The device of clauses A1-A8, wherein the device is configured to receive the instruction using a first communication interface; and wherein the device is configured to output the comparison result value using a second communication interface different from the first communication interface.

Clause A12. The device of clause A11, further comprising: a first pin configured for the first communication interface; and a second pin for the second communication interface.

Clause A13. The device of clauses A1-A12, wherein the device is configured to refrain from outputting the comparison result value when the data for the device matches the reference value.

Clause A14. The device of clauses A1-A13, wherein the comparison result value comprises a single bit.

Clause A15. The device of clauses A1-A14, wherein, to determine the comparison result value, the device is configured to determine the comparison result value as a difference between the data for the device and the reference value.

Clause A16. The device of clause A15, wherein the reference value comprises: a prior measurement performed by the device; a derived value determined using the prior measurement performed by the device and at least one other prior measurement performed by another device; a value output by another device; or an expected value of the instruction.

Clause A17. A method comprising: receiving, by a device, from a controller, an instruction requesting data for the device; determining, by the device, a comparison result value based on a comparison of the data for the device and a reference value; determining, by the device, whether to respond to the instruction based on the comparison result value; and in response to determining to respond to the instruction, outputting, by the device, to the controller, the comparison result value, wherein outputting the comparison result value comprises refraining from outputting the data for the device.

Clause A18. A system comprising: a controller configured to output an instruction requesting data for the device; and a device configured to: receive, from the controller, the instruction requesting data for the device; determine a comparison result value based on a comparison of the data for the device and a reference value; determine whether to respond to the instruction based on the comparison result value; and in response to a determination to respond to the instruction, output, to the controller, the comparison result value, wherein, to output the comparison result value, the device is configured to refrain from outputting the data for the device.

Clause A19. The system of clause A18, wherein the device is further configured to receive the reference value from a second device.

Clause A20. The system of clause A18, wherein the instruction comprises the reference value.

Clause B1. A battery cell circuit of a battery management system configured to: receive, from a previous battery cell circuit of a plurality of battery cell circuits connected in a daisy chain configuration or ring configuration, an instruction requesting a value for the battery cell circuit; determine a comparison result value based on a comparison of the value for the battery cell circuit and a reference value; and output, to a controller, the comparison result value, wherein, to output the comparison result value, the battery cell circuit is configured to refrain from outputting the value for the battery cell circuit.

Clause B2. The battery cell circuit of clause B1, wherein the battery cell circuit is further configured to receive the reference value from a second battery cell circuit the plurality of battery cell circuits connected in the daisy chain configuration or ring configuration.

Clause B3. The battery cell circuit of clause B2, wherein the battery cell circuit is further configured to: output, to a subsequent battery cell circuit of the plurality of battery cell circuits connected in the daisy chain configuration or ring configuration, the instruction; receive, from the subsequent battery cell circuit, the reference value; and output, to the previous battery cell circuit, the reference value.

Clause B4. The battery cell circuit of clause B3, wherein the second battery cell circuit includes the subsequent battery cell circuit.

Clause B5. The battery cell circuit of clause B3, wherein the second battery cell circuit is connected to the battery cell circuit by the daisy chain configuration or ring configuration using at least the subsequent battery cell circuit.

Clause B6. The battery cell circuit of clause B1, wherein the instruction comprises the reference value.

Clause B7. The battery cell circuit of clauses B1-B6, wherein, to determine the comparison result value, the battery cell circuit is configured to determine the comparison result value as a first value when the value for the battery cell circuit matches the reference value.

Clause B8. The battery cell circuit of clause B7, wherein the value for the battery cell circuit comprises diagnostic data or a register value.

Clause B9. The battery cell circuit of clause B7-B8, wherein, to determine the comparison result value, the battery cell circuit is configured to determine the comparison result value as a second bit value when the value for the battery cell circuit does not match the reference value.

Clause B10. The battery cell circuit of clauses B1-B9, wherein the comparison result value comprises a single bit.

Clause B11. The battery cell circuit of clause B10, wherein, to output the comparison result value, the battery cell circuit is configured to output a frame comprising the single bit.

Clause B12. The battery cell circuit of clause B11, wherein the frame comprises the single bit and a node identifier assigned to the battery cell circuit.

Clause B13. The battery cell circuit of clauses B1-B6, wherein, to determine the comparison result value, the battery cell circuit is configured to determine the comparison result value as a difference between the value for the battery cell circuit and the reference value.

Clause B14. The battery cell circuit of clause B13, wherein the value for the battery cell circuit comprises a voltage value, a current value, a resistance value, or a temperature value.

Clause B15. The battery cell circuit of clause B1-B14, wherein the reference value comprises a previously output value of the value for the battery cell circuit or a received value.

Clause B16. A controller configured to: output, to a plurality of battery cell circuits connected in a daisy chain configuration or ring configuration, an instruction requesting a value for a battery cell circuit of the plurality of battery cell circuits; receive a comparison result value from the plurality of battery cell circuits connected in the daisy chain configuration or ring configuration; and determine a value for the battery cell circuit based on the comparison result value and a reference value.

Clause B17. The controller of clause B16, wherein, to determine the value, the controller is configured to, determine the value as the reference value when the comparison result value indicates the value for the battery cell circuit matches the reference value.

Clause B18. The controller of clause B16, wherein, to determine the value, the controller is configured to, determine the value for the battery cell circuit as the reference value modified by the comparison result value.

Clause B19. A system comprising: a plurality of battery cell circuits connected in a daisy chain configuration or ring configuration, wherein a battery cell circuit of the plurality of battery cell circuits is configured to: receive, from a previous battery cell circuit of a plurality of battery cell circuits connected in a daisy chain configuration or ring configuration, an instruction requesting a value for the battery cell circuit; determine a comparison result value based on a comparison of the value for the battery cell circuit and a reference value; and output, to a controller, the comparison result value, wherein, to output the comparison result value, the battery cell circuit is configured to refrain from outputting the value for the battery cell circuit.

Clause B20. The system of clause B19, further comprising a controller configured to process the comparison value to determine the value for the battery cell circuit.

In one or more examples, the functions being performed described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this way, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects have been described in this disclosure. These and other aspects are within the scope of the following claims.

The invention claimed is:

1. A battery cell circuit of a battery management system configured to:
   receive, from a previous battery cell circuit of a plurality of battery cell circuits connected in a daisy chain configuration or ring configuration, an instruction requesting a value for the battery cell circuit;
   determine a comparison result value based on a comparison of the value for the battery cell circuit and a reference value; and
   output, to a controller, the comparison result value, wherein, to output the comparison result value, the battery cell circuit is configured to refrain from outputting the value for the battery cell circuit.

2. The battery cell circuit of claim 1, wherein the battery cell circuit is further configured to receive the reference value from a second battery cell circuit the plurality of battery cell circuits connected in the daisy chain configuration or ring configuration.

3. The battery cell circuit of claim 2, wherein the battery cell circuit is further configured to:
   output, to a subsequent battery cell circuit of the plurality of battery cell circuits connected in the daisy chain configuration or ring configuration, the instruction;
   receive, from the subsequent battery cell circuit, the reference value; and
   output, to the previous battery cell circuit, the reference value.

4. The battery cell circuit of claim 3, wherein the second battery cell circuit includes the subsequent battery cell circuit.

5. The battery cell circuit of claim 3, wherein the second battery cell circuit is connected to the battery cell circuit by the daisy chain configuration or ring configuration using at least the subsequent battery cell circuit.

6. The battery cell circuit of claim 1, wherein the instruction comprises the reference value.

7. The battery cell circuit of claim 1, wherein, to determine the comparison result value, the battery cell circuit is configured to determine the comparison result value as a first value when the value for the battery cell circuit matches the reference value.

8. The battery cell circuit of claim 7, wherein the value for the battery cell circuit comprises diagnostic data or a register value.

9. The battery cell circuit of claim 7, wherein, to determine the comparison result value, the battery cell circuit is configured to determine the comparison result value as a second bit value when the value for the battery cell circuit does not match the reference value.

10. The battery cell circuit of claim 1, wherein the comparison result value comprises a single bit.

11. The battery cell circuit of claim 10, wherein, to output the comparison result value, the battery cell circuit is configured to output a frame comprising the single bit.

12. The battery cell circuit of claim 11, wherein the frame comprises the single bit and a node identifier assigned to the battery cell circuit.

13. The battery cell circuit of claim 1, wherein, to determine the comparison result value, the battery cell circuit is configured to determine the comparison result value as a difference between the value for the battery cell circuit and the reference value.

14. The battery cell circuit of claim 13, wherein the value for the battery cell circuit comprises a voltage value, a current value, a resistance value, or a temperature value.

15. The battery cell circuit of claim 1, wherein the reference value comprises a previously output value of the value for the battery cell circuit or a received value.

16. A system comprising:
   a plurality of battery cell circuits connected in a daisy chain configuration or ring configuration, wherein a battery cell circuit of the plurality of battery cell circuits is configured to:
      receive, from a previous battery cell circuit of a plurality of battery cell circuits connected in a daisy chain configuration or ring configuration, an instruction requesting a value for the battery cell circuit;
      determine a comparison result value based on a comparison of the value for the battery cell circuit and a reference value; and
      output, to a controller, the comparison result value, wherein, to output the comparison result value, the battery cell circuit is configured to refrain from outputting the value for the battery cell circuit.

17. The system of claim 16, further comprising a controller configured to process the comparison result value to determine the value for the battery cell circuit.

* * * * *